United States Patent
Singh et al.

(10) Patent No.: US 8,481,605 B2
(45) Date of Patent: Jul. 9, 2013

(54) RIGID POLYURETHANE FOAM AND SYSTEM AND METHOD FOR MAKING THE SAME

(75) Inventors: Sachchida Nand Singh, Moorestown, NJ (US); Jinhuang Wu, Troy, MI (US); Alan J. Hamilton, Duisburg (BE)

(73) Assignee: Huntsman International LLC, The Woodlands, TX (US)

( * ) Notice: Subject to any disclaimer, the term of this patent is extended or adjusted under 35 U.S.C. 154(b) by 17 days.

(21) Appl. No.: 12/783,729

(22) Filed: May 20, 2010

(65) Prior Publication Data

US 2011/0124757 A1  May 26, 2011

Related U.S. Application Data

(60) Provisional application No. 61/180,282, filed on May 21, 2009.

(51) Int. Cl.
*C08G 18/28* (2006.01)

(52) U.S. Cl.
USPC ........... 521/131; 521/130; 521/164; 521/167; 521/170; 521/174

(58) Field of Classification Search
USPC .................. 521/130, 131, 164, 167, 170, 174
See application file for complete search history.

(56) References Cited

U.S. PATENT DOCUMENTS

| | | |
|---|---|---|
| 5,539,008 A | 7/1996 | Dams et al. |
| 5,631,306 A | 5/1997 | Dams et al. |
| 5,648,019 A | 7/1997 | White, III et al. |
| 5,677,359 A | 10/1997 | White, III et al. |
| 5,684,057 A | 11/1997 | White, III et al. |
| 5,741,825 A | 4/1998 | Inagaki et al. |
| 5,762,822 A | 6/1998 | Tucker |
| 5,883,146 A | 3/1999 | Tucker |
| 6,423,759 B1 | 7/2002 | Schilling |
| 6,562,880 B1 | 5/2003 | Doerge et al. |
| 6,831,110 B2 | 12/2004 | Ingold et al. |
| 7,262,227 B2 | 8/2007 | Shibanuma et al. |
| 7,279,451 B2 | 10/2007 | Singh et al. |
| 7,438,825 B1 | 10/2008 | Chen et al. |
| 7,438,826 B1 | 10/2008 | Chen et al. |
| 7,442,321 B1 | 10/2008 | Chen et al. |
| 7,479,238 B1 | 1/2009 | Chen et al. |
| 2007/0100009 A1 | 5/2007 | Creazzo et al. |
| 2007/0100010 A1 | 5/2007 | Creazzo et al. |
| 2007/0100011 A1 | 5/2007 | Creazzo et al. |
| 2008/0313985 A1 | 12/2008 | Duncan |

FOREIGN PATENT DOCUMENTS

| | | | |
|---|---|---|---|
| JP | 5179043 | | 7/1993 |
| WO | WO 2009/014965 | | 1/2009 |
| WO | WO 2009/014966 | | 1/2009 |
| WO | 2009/073487 | * | 6/2009 |

OTHER PUBLICATIONS

Robin, M. L., et al. "Development of a Novel Foam Expansion Agent for Polyurethane Foams" Proceedings of the Polyurethanes 2008 Technical Conference, San Antonio, Texas, Sep. 29-Oct. 1, 2008.

Bowman, J. J., et al. "HBA-1 Blowing Agent Commercialization Status", Proceedings of the Polyurethanes 2008 Technical Conference, San Antonio, Texas, Sep. 29-Oct. 1, 2008.

Chen, B., et al. "Investigation of New Low GWP Blowing Agents for Rigid Polyurethane Foams", Proceedings of the Polyurethanes 2008 Technical Conference, San Antonio, Texas, Sep. 29-Oct. 1, 2008.

* cited by examiner

*Primary Examiner* — John Cooney
(74) *Attorney, Agent, or Firm* — Robert A. Diaz

(57) ABSTRACT

An embodiment of a closed-cell polymeric rigid foam may be made using a one-shot method and a reaction system that includes a hydrofluoroalkene physical blowing agent and a polyol mixture having an aminic polyol. The hydrofluoroalkene blowing agent has 3 to 5 carbon atoms and a boiling point between 10° C. and 40° C. at 1 atmosphere pressure. Embodiments of rigid foams may have high closed cell content and are particularly well suited for thermal insulation.

14 Claims, No Drawings

RIGID POLYURETHANE FOAM AND SYSTEM AND METHOD FOR MAKING THE SAME

CROSS REFERENCE TO RELATED APPLICATIONS

This application claims the benefit of U.S. Provisional Application No. 61/180,282, which was filed on May 21, 2009.

TECHNICAL FIELD

Embodiments of the present invention relate generally to polyurethane foams and more particularly rigid, closed-cell polyurethane foams and reaction systems and methods for making such foams.

BACKGROUND

Closed-cell rigid polyurethane foams are useful for insulating appliances and buildings due to their low thermal conductivity and dimensional stability at low densities. Rigid polyurethane (PU) foams and polyurethane-polyisocyanurate (PIR) foams are conventionally prepared by reacting appropriate polyisocyanates and active hydrogen containing polyols in presence of suitable physical blowing agents. Physical blowing agents produce their blowing effect by physical expansion rather than by chemical reaction. And, because liquid physical blowing agents tend to be easier to ship, store, handle, and use, they are typically used more extensively (in rigid foam applications) than gaseous ones. Thus, liquid chlorofluorocarbons (CFC's) and hydrochlorofluorocarbons (HCFC's) have been widely used to produce closed-cell polyurethane foams with good thermal insulation and dimensional stability properties. However, CFCs and HCFC's have fallen into disfavor due to their ozone depletion potential (ODP) and to their global warming potential (GWP). Because of these concerns many countries have restricted, or will restrict, the use of CFC's and HCFC's.

Although blowing agents other than CFC's and HCFC's are available, they too have disadvantages. For example, both saturated hydrofluorocarbons (HFC's) and hydrocarbons (HC's) have zero ODP, but saturated HFC's have a relatively high GWP and HC's are highly flammable volatile organic compounds (VOCs). Thus, there are questions about the acceptability of long-term use of saturated HFC's, and, in at least some insulation applications, the cost associated with safe use and risk management of HC's can be prohibitive.

Perfluoroalkanes (alkanes where all hydrogen has been substituted by fluorine) and perfluoroalkenes are two other types of materials that have been evaluated as physical blowing agents. Perfluoroalkanes have an extremely high GWP, which has virtually eliminated their use as commercial foam blowing agents. Further, for different reasons, commercial use of perfluoroalkenes (as blowing agents in rigid polyurethane foams) is not widespread. For instance, perfluoroalkenes are expensive to make and they are not very soluble in components typically used to make polyurethane foams.

Promising physical blowing agents include various hydrogen-containing fluoroalkenes (as opposed to perfluoralkenes). These hydrofluoroalkenes may not have a substantial negative affect on atmospheric chemistry. For example, they may, by comparison to other halogenated blowing agents, contribute little to ozone depletion, and do not, by comparison to many saturated hydrofluorocarbon blowing agents, substantially contribute to global warming. But rigid polyurethane foams produced with such blowing agents (using known processes and reaction systems) do not have commercially attractive physical properties at low enough densities to make their use economically feasible. In short, the properties associated with such hydrofluoroalkene blown foams have generally been inferior to historic CFC and HCFC blown foams. Attempts to solve this problem have focused on making azeotropic blends with hydrofluoroalkenes. For instance, azeotropic blends have been made with hydrofluoroalkenes and at least one of another hydrofluoroalkene, saturated hydrofluorocarbons, hydrocarbons, trifluoroiodomethane, and other blowing agents. Such attempts have met with limited success.

Thus, there is a need for a reaction system including a blowing agent that does not substantially contribute to ozone depletion and global warming to make closed-cell rigid polyurethane foams and polyurethane-polyisocyanurate foams with good physical properties. The blowing agent of such reaction system should be normally liquid and should not be a volatile organic compound. Likewise, there is a need for methods of using such reaction systems and the foams produced therefrom.

DETAILED DESCRIPTION

According to an embodiment of the present invention, a reaction system including a polyol side and an isocyanate side is used to produce a rigid, closed-cell foam having good physical properties. The polyol side may include an isocyanate-reactive component and a hydrofluoroalkene blowing agent, and the isocyanate side may include an organic polyisocyanate such as diphenylmethane diisocyanate (MDI), although embodiments are not so limited. If the two sides are mixed, they react to form a rigid foam. In some embodiments, the rigid foam may be a polyurethane foam and in other embodiments, the rigid foam may be a polyisocyanurate foam. Embodiments of such rigid foams may be used to insulate houses and other buildings (e.g. walls, roofing, etc.), appliances (e.g. refrigerators, freezers, and the like), piping, vehicles, and much more.

As used herein, molecular weights, equivalent weights, and group functionalities are number averaged for polymeric compounds and absolute for pure compounds, unless otherwise indicated. The term "nominal functionality" is used to specify the minimum hydroxyl functionality of polyols. Nominal functionality is the expected functionality, which is equal to the functionality of the initiator.

Isocyanate Side of an Embodiment of the Reaction System

The isocyanate side of embodiments of the reaction system may include any organic polyisocyanate that is suitable for the production of rigid polyurethane or urethane-modified polyisocyanurate foams. For example, useful organic polyisocyanates include those having a functionality greater than or equal to 2.0 such as diphenylmethane diisocyanate (MDI) in the form of its 2,4'- or 4,4'-isomers and mixture thereof, mixtures of MDI and oligomers thereof (e.g. "crude" MDI), and polymeric MDI (e.g. polymethylene polyphenylene polyisocyantes). Other suitable organic isocyanates include toluene diisocyanate (e.g. 2,4- or 2,6-isomers and mixtures thereof); 1,5 naphthalene diisocyanate; 1,4-diisocyanatobenzene; aliphatic diisocyanates such as isophorone diisocyanate, 1,6-diisocyanatohexane, and 4,4-diisocyanato-dicyclohexylmethane; and polyisocyanates modified with various groups including ester groups, urea groups, biuret groups, allophanate groups, carbodiimide groups, isocyanurate groups, uretdione groups and urethane groups, although embodiments are not so limited.

In some embodiments, the isocyanate side includes at least 50% by weight of aromatic polyisocyanates such as MDI, and in other embodiments, the isocyanate side includes at least 80%, 90%, or even greater than 99% of an aromatic polyisocyanate, although embodiments are not so limited. Furthermore, the aromatic polyisocyanate may contain from 5% to 50%, 10% to 40%, 15% to 35%, 20% to 34%, or 25 to 33.8% by weight of free isocyanate (—NCO) groups, although embodiments are not so limited. The isocyanate side should be liquid at 25° C. and 1 atmosphere pressure. Furthermore, it is desirable for the isocyanate side to have a viscosity at 25° C. of less than 10,000 cps, less than 5,000 cps, or less than 3,000 cps, without limiting embodiments of the present invention to such viscosities.

In some embodiments, the isocyanate side includes polymeric MDI, wherein 20-80%, or even 30-70% by weight of the polymeric MDI includes 2,2' MDI, 2,'4 MDI, 4,4' MDI, or mixtures thereof and the remainder of the polymeric MDI includes higher (e.g. greater than 2) functionality homologues of polymeric MDI. The weight ratio of 4,4'-MDI to 2,4' and 2,2' MDI (taken together) may be from 99:1 to about 50:50 or about 98:2 to about 60:40. In one embodiment, the isocyanate side may include aromatic polyisocyanates that contain only isocyanates of the MDI series and isocyanate-group-containing derivatives of MDI series isocyanates.

Polyol Side of an Embodiment of the Reaction System Isocyanate-reactive Component According to an embodiment of a reaction system, the isocyanate reactive component includes a mixture of two different types of polyols. The first type of polyol (referred to in the Examples as a "Ci type polyol" or "Ci polyol") is an aminic polyol. In some embodiments, the aminic polyol is an aromatic amine-initiated polyol and in other embodiments, the aminic polyol is a Mannich polyol. The second type of polyol is any suitable polyol other than an aminic aromatic polyol of the first type. In some embodiments of the reaction system, each polyol type may include one kind of polyol. Alternatively, in some embodiments, each polyol type may include mixtures of different kinds of polyols of the respective type. In yet other embodiments, one polyol type may be one kind of polyol whereas the other polyol type may be a mixture of different kinds of polyols.

Suitable aromatic amine-initiated polyols include those amine-initiated polyols having a nominal hydroxyl functionality of at least 2 and a molecular weight of 300 to 10,000. The initiator used to make such polyols includes aromatic amine having one or more aromatically bound reactive-amine groups such as toluenediamines (including 2,4 and 2,6 toluenediamines) and diaminodiphenylmethanes (including mixtures thereof). Additional examples of suitable aromatic-bound amine-initiators include aniline, polymethylene polyphenylene polyamines, N-alkylphenylene-diamines, o-chloro-aniline, p-aminoaniline, diaminonaphthalene, and mixtures of these. In some embodiments, aromatic amine-initiators include mixtures of initiators such as mixtures of diaminodiphenylmethanes with higher order polymethylene polyphenylene polyamines. These mixtures may be prepared by condensation of aniline and formaldehyde using known processes.

In preferred embodiments, the aromatic amine-initiated polyol is made by alkoxylating the aromatic amine initiator with one or more alkylene oxides. Individual alkylene oxides or combinations thereof may be used to prepare the amine-initiated polyol. Suitable alkylene oxides include ethylene oxide, propylene oxide, butylene oxide, and combinations thereof. Propylene oxide and ethylene oxide are especially preferred for alkoxylating the aromatic amine-initiator. The aromatic amine-initiator is alkoxylated until the desired molecular weight is reached. When polymerization is completed, the polyol should include primary hydroxyl groups, secondary hydroxyl groups, or both that are bound to aliphatic carbon atoms. The polyols, however, may contain residual reactive amine groups after alkoxylation. Processes for the production of polyols by alkoxylation of aromatic amines are well known in the art.

In a preferred embodiment, the alkoxylated aromatic amines are liquids at 25° C., have molecular weights below 5000, and hydroxyl functionalities of 3 to 8. Because polyalkoxylated polyols are polymeric in nature, molecular weights and hydroxyl group functionalities noted herein are number averaged unless otherwise specified. Furthermore, hydroxyl equivalent weights for some embodiments of alkoxylated aromatic amine polyols is between 60 and 800, in other embodiments is 80 to 700, and still other embodiments 90 to 600 (number averaged).

Suitable Mannich polyols include those Mannich polyols having a nominal hydroxyl functionality of at least 2, a molecular weight of 150 to 10,000, and having at least one secondary or tertiary amine nitrogen atom per molecule. In some embodiments, Mannich polyols are the condensates of an aromatic compound, an aldehyde, and an alkanol amine. For example, a Mannich condensate may be produced by the condensation of either or both of phenol and an alkylphenol with formaldehyde and one or more of monoethanolamine, diethanolamine, and diisopronolamine. In particular, embodiments, the Mannich condensates are those of phenol or nonylphenol with formaldehyde and diethanolamine. The Mannich condensates of the present invention may be made by any known process. In some embodiments, the Mannich condensates serve as initiators for alkoxylation. Any alkylene oxide may be used for alkoxylating one or more Mannich condensates. For example, suitable alkylene oxides include ethylene oxide, propylene oxide, butylene oxide, and combinations thereof. When polymerization is completed, the Mannich polyol should include primary hydroxyl groups, secondary hydroxyl groups, or both bound to aliphatic carbon atoms.

Preferably, the Mannich polyols of the present invention are liquids at 25° C. and have a molecular weight of 200 to 8000. In some embodiments, however, the Mannich polyols have a molecular weight of 250 to 5000 or greater than 300 but less than 5000. Furthermore, the Mannich polyols may have a hydroxyl equivalent weight range from 100 to 800, or from 115 to 600 and a hydroxyl functionality of 2 to 8, or 3 to 6. Because Mannich polyols are usually polymeric in nature the forgoing parameters are number averaged.

The second type of polyol (referred to in the Examples as a "Cii type polyol" or "Cii polyol") in the isocyanate reactive component can be one or more polyols that are free of amine groups and that are known polyols for making polyurethanes foams. Furthermore, if the first polyol type includes an aromatic amine-initiated polyol, then the second polyol type is free of any aromatically bound secondary or tertiary amine groups. Likewise, if the polyol of the first type is a Mannich polyol, then the polyol of the second type includes a polyol that is not a Mannich polyol.

Generally, the polyol of the second type is a liquid at 25° C., has a molecular weight of from 60 to 10,000, a nominal hydroxyl functionality of at least 2, and a hydroxyl equivalent weight of 30 to 2000, although embodiments are not so limited. For instance, a polyol of the second type may have a molecular weight of from 300 to 10,000, and preferably, it is less than 5000. Additionally, polyols of the second type may have a hydroxyl equivalent weight of from 30 to 1500, even more preferably from 30 to 800. In some embodiments, the equivalent weight of the second type of polyol is from 30 to 300 and in some embodiments, it is from 800 to 2000.

The term "nominal" functionality may be used herein instead of a number averaged value. Nominal functionality is the expected functionality, which is equal to the functionality of the initiator. Thus; the nominal hydroxyl functionality of a polyol of the second type is at least two and the maximum functionality is 10 with a hydroxyl functionality of 8 or less preferred.

Examples of suitable polyols of the second type include polyether polyols made by alkoxylating initiators containing from 2 to 8 active hydrogen atoms per molecule. In this case, the initiators may be one or more of glycols, glycerol, trimethylolpropane, triethanolamine, pentaerythritol, sorbitol, sucrose, ethylenediamine, ethanolamine, and diethanolamine and the alkylene oxides may be one or more of ethylene oxide, propylene oxide, and butylene oxide. Preferably, ethylene oxide, propylene oxide, or combinations thereof, are used to alkoxylate initiators.

Other suitable polyols of the second type include polyesters obtained by the condensation of appropriate proportions of poly-functional polyols with polycarboxylic acids. Examples of poly-functional polyols suitable for preparing such polyester polyols are diethylene glycol, polyethylene glycol, and glycerol, although embodiments are not limited thereto. Polycarboxylic acids suitable for making polyester polyols may be any of the known aliphatic, cycloaliphatic, aromatic, and/or heterocyclic polycarboxylic acids and may be substituted, (e.g. with halogen atoms) and/or unsaturated.

Additional examples of suitable polyols of the second type include hydroxyl-terminated polythioethers, polyamides, polyesteramides, polycarbonates, polyacetals, polyolefins, polysiloxanes, and simple glycols such as ethylene glycol, butanediols, diethylene glycol, triethylene glycol, the propylene glycols, dipropylene glycol, tripropylene glycol, and mixtures thereof.

According to some embodiments of the present invention, the weight ratio of the first type of polyol to the second type of polyol is from 98:2 and 20:80, and the combined weights of all of the first and second types of polyols in the reaction system is at least 20% of the total weight of the reaction system. In other embodiments, the weight ratio of the first type of polyol to the second type of polyol is from 97:3 to 40:60 and the combined weights of all polyols is at least 25% of the total weight of the reaction system. In yet another embodiment, the weight ratio of the first type of polyol to the second type of polyol is from 90:10 to 40:60 and the combined weights of all polyols is at least 30% of the total weight of the reaction system.

The isocyanate reactive component of the polyol side of the reaction system may also include isocyanate reactive materials that are not polyols such as, without limitation, polyamines and polythiols. Suitable polyamines include primary and secondary amine-terminated polyethers, aromatic diamines such as diethyltoluene diamine and the like, aromatic polyamines, and combinations thereof. In some embodiments, one or more of these isocyanate-reactive, non-polyol materials may comprise less than 10% by weight of the total reaction system, and in other embodiments, they may comprise less than 5% by weight.

Blowing Agent

In some embodiments of the present invention, one or more blowing agents may be provided in the polyol side of the reaction system although embodiments are not limited. Alternatively or additionally, one or more of the blowing agents may be present in the isocyanate side of the reaction system. The blowing agent component may include one or more physical blowing agents, or one or more physical blowing agents and one or more chemical blowing agents.

The physical blowing agent component of the present invention includes one or more normally liquid hydrofluoroalkene compounds having 3 to 5 carbon atoms per molecule. Because this physical blowing agent is an alkene, it also has at least one unsaturation or carbon-carbon double bond. Furthermore, in addition to the fluorine and carbon atoms, a hydrofluoroalkene blowing agent may also contain one or more hydrogen atoms and/or halogen atoms (other than fluorine) per molecule. Preferred hydrofluoroalkene blowing agents have a boiling point (BP ° C.) greater than or equal to 14° C. as measured at 1 atmosphere pressure although embodiments are not so limited. For instance, a hydrofluoroalkene blowing agent may have a boiling point (BP°) between 10° C. and 40° C. or between 13° C. and 40° C. as measured at 1 atmosphere pressure. Nevertheless, in some embodiments the hydrofluoroalkene blowing agent has a boiling point of 14° C. to 40° C. as measured at 1 atmosphere pressure.

Suitable hydrofluoroalkene blowing agents include, but are not limited to, those listed in Table 1, below.

TABLE 1

| MW | Structure | Name | BP | CAS # |
|---|---|---|---|---|
| 211 | $CF_3—CBr=CF_2$ | 2-bromopentafluoropropene | 25-26 | 431-49-2 |
| 211 | $CF_3—CF=CBrF$ | 1-bromopentafluoropropene | 27-28 | 53692-47-0 |
| 211 | $CBrF_2—CF=CF_2$ | 3-bromopentafluoropropene | 25.5 | 431-56-1 |
| 196 | $CF_3—CF_2—CF_2—CH=CH_2$ | 3,3,4,4,5,5,5-heptafluoro-1-pentene | 32 | 355-08-8 |
| 193 | $CF_2=CH—CBrF_2$ | 3-bromo-1,1,3,3-tetrafluoropropene | 33.5 | 460-61-7 |
| 193 | $CHF=CBr—CF_3$ | 2-bromo-1,3,3,3-tetrafluoropropene | 29-32 | 396716-43-1 |
| 193 | $CF_3—CF=CHBr$ | 1-bromo-2,3,3,3-tetrafluoropropene | 32-34 | 666-32-0 |
| 182 | $CF_2=CF—CF_2—CHF_2$ | 1,1,2,3,3,4,4-heptafluorobut-1-ene | 20-21 | 680-54-6 |
| 175 | $CF_3CBr=CH_2$ | 2-bromo-3,3,3-trifluoropropene | 33-33.5 | 1514-82-5 |
| 175 | $CF3—CH=CHBr$ | E-1-bromo-3,3,3-trifluoropropene-1 | 39-39.5 | 149597-47-7 |
| 164 | $CF_3—CH=CH—CF_3$ | (Z)-1,1,1,4,4,4-hexafluoro-2-butene | 31-36 | 692-49-9 |
| 164 | $CF3—C(=CH2)—CF3$ | 3,3,3-trifluoro-2-(trifluoromethyl) propene | 15 | 382-10-5 |
| 130.5 | $CF_3—CH=CHCl$ | 1-chloro-3,3,3-trifluoropropene | 21 | 2790-43-0 |
| 130.5 | $CF_3—CCl=CH_2$ | 2-chloro-3,3,3-trifluoropropene | 14-15 | 2730-62-3 |
| 110 | $CF_3—CH=CH—CH_3$ | 1,1,1-trifluoro-2-butene | 17 | 406-39-3 |

In some embodiments the hydrofluoroalkene blowing agent component may include any or all isomers of 1-chloro-3,3,3-trifluoropropene (HCFO-1233zd) including stereo-isomers (e.g., cis-, trans-, or mixture thereof). In some embodiments the hydrofluoroalkene blowing agent component may include the cis-stereo-isomer (also referred as z-isomer) of 1,1,1,4,4,4-hexafluoro-2-butene (HFO-1336mzz), although embodiments are not so limited.

Generally, the physical blowing agent component of the present invention may be at least 2% by weight of the total reaction system. The physical blowing agent component, however, may be from 2.5% by weight to 20% by weight of the total reaction system, or from 2.5% by weight to 15% by weight of the total reaction system. Furthermore, the hydrofluoroalkene portion of the blowing agent component may be at least 25% by weight of the total physical blowing agent. Alternatively, it may be at least 50% by weight, at least 75% by weight, or at least 90% by weight of the physical blowing agent component.

In some embodiments, a hydrofluoroalkene as described above may be the only physical blowing agent in the physical blowing agent component. But in other embodiments, the physical blowing agent component may include the hydrofluoroalkene blowing agent and another physical blowing agent. Other suitable physical blowing agents include air, nitrogen, carbon dioxide, hydrofluoroalkanes, alkanes, alkenes, ketones, ethers, and mono-carboxylic acid esters boiling below 60° C. at 1 atmosphere pressure, and combinations thereof. Examples of saturated hydrofluorocarbons (HFCs) that are suitable co-blowing agents include those that are vaporizable under foaming conditions such as 1,1-difluoroethane (HFC-152a); 1,1,1,2-tetrafluoroethane (HFC-134a); pentafluoroethane (HFC-125); 1,1,1,3,3-pentafluoropropane (HFC-245fa); 1,1,1,3,3-pentafluorobutane (HFC-365mfc), and combinations thereof. Examples of suitable alkanes that may be included in the physical blowing agent component include one or more of n-butane, n-pentane, isopentane, and cyclopentane. Examples of other suitable blowing agents that may be included in the physical blowing agent component include 1-pentene and/or 2-pentene (alkenes); acetone (a ketone); dimethyl ether (an ether); and methyl formate, ethyl formate, methyl acetate, and mixtures thereof (low-boiling mono-carboxylic acid esters).

The blowing agent component may also include one or more chemical blowing agents. For example, water and/or carboxylic acids may react with isocyanate under foam forming conditions to liberate $CO_2$. In some embodiments, the reaction system contains at least 0.2% and less than 5% by weight of water relative to the total weight of the reaction system. In other embodiments, water is at least 0.2% by weight of the total weight of the reaction system but less than 4%, 3%, or 2.5% by weight of the reaction system. In embodiments where carboxylic acids or polycarboxylic acids are used as a co-blowing agent, such acid should contribute less than 10% by weight of the reaction system. More preferably, such acid should contribute less than 5%, or less than 3% to the total weight of the reaction system.

In some embodiments, the amount of the one or more blowing agents in the blowing agent component is that which results in foam having a density below 4.5 lb/cu.ft. Alternatively, the resultant foam may have a density of from 1.2 to 4.2 lb/cu. ft., 1.4 to 4.0 lb/cu. ft., or 1.6 to 3.8 lb/cu. ft. Furthermore, embodiments of a closed-cell rigid foams may have a closed cell content of greater than 85%, and preferably 87% or greater as measured according to ASTM D6226, although embodiments are not limited thereto.

Other Components

In some embodiments of the reaction system the polyol side, and/or the isocyanate side, may include one or more additional components or additives that are useful to rigid polyurethane foams. Examples of useful additives include, without limitation, catalysts, surfactants, fire retardants, smoke suppressants, fillers, reinforcements, antioxidants, UV stabilizers, antistatic agents, infrared radiation absorbers, viscosity reducing agents, pigments, dyes, mold release agents, antifungal agents, biocides, and combinations of such additives.

Suitable catalysts include, without limitation, urethane catalysts, isocyanurate catalysts, and combinations of these. For example, catalysts for use in embodiments of the present invention include, without limitation, tertiary amine catalysts such as dimethylcyclohexylamine, benzyldimethylamine, N,N,N',N'',N''-pentamethyldiethylenetriamine, 2,4,6-tris-(dimethylaminomethyl)-phenol, triethylenediamine, N,N-dimethyl ethanolamine, and combinations thereof; organometallic compounds such as potassium octoate (2-ethyl hexanoate), potassium acetate, dibutyltin dilaurate, dibutyltin diacetate, and combinations thereof; quaternary ammonium salts such as 2-hydroxypropyl trimethylammonium formate; N-substituted triazines such as N,N', N''-dimethylaminopropylhexahydrotriazine; and combinations of such useful catalysts.

One or more surfactants may also be useful in an embodiment of the present invention. Examples of commonly used surfactants include, without limitation, cell stabilizing surfactants used in rigid polyurethane and rigid polyurethane-polyisocyanurate foams such as polyorganosiloxane polyether copolymers, which are well known in the art. Additional examples of suitable surfactants include phenol alkoxylates and alkylphenol alkoxylates such as ethoxylated phenol and ethoxylated nonylphenol respectively.

In certain embodiments, a flame retardant may be useful additive for a polyurethane or polyisocyanurate foam. Examples of flame retardants include organo-phosphorous compounds such as organic phosphates, phosphites, phosphonates, polyphosphates, polyphosphites, polyphosphonates, and ammonium polyphosphates such as triethyl phosphate, diethy ethyl phosphonate, and tris(2-chloropropyl)-phosphate; and halogenated fire retardants such as tetrabromophthalate esters and chlorinated parrafins.

Many other additives may be useful in an embodiment of the present invention. A non-limiting list of other such additives includes viscosity reducers such as propylene carbonate and 1-methyl-2-pyrrolidinone; infra-red opacifiers such as carbon black, titanium dioxide, and metal flakes; cell-size reducing compounds such as inert, insoluble, non-volatile fluorinated compounds and perfluorinated compounds; fillers such as calcium carbonate, silica, silicate minerals, and combinations thereof; reinforcing agents such as glass fibers, metal fibers, and ground up foam waste; mold release agents such as zinc stearate and zinc laurate; antioxidants such as butylated hydroxy toluene and other sterically hindered phenols; UV stabilizers such as hindered amine light stabilizers (HALS); and pigments and dyes such as titanium dioxide, azo-/diazo dyestuffs, and phthalocyanines.

Preferably, the combined weight of all additives used in a particular embodiment is from 0.001% to 30% by weight of the total reaction system, although embodiments are not so limited. In other, nonlimiting embodiments, the combined weight of all optional additives used is from 0.01% to 20% of the total weight of the reaction system, or from 0.02% to 10% of the total weight of the reaction system.

Processes and Foams

According to an embodiment of the present invention, a rigid, closed-cell polyurethane or polyisocyanurate foam may be made using an embodiment of the reaction system. Processing to make such foams may be by a two component mixing activated system. Generally, the polyol side of the reaction system is mixed with the isocyanate side of the reaction system to activate polymerization. The polyol side is desirably liquid under the conditions of processing although embodiments are not so limited. In this embodiment the polyol side of the reaction system is formulated by combining the desired isocyanate-reactive ingredients, blowing agent, and/or additives (if present). Likewise, the isocyanate side of the reaction system is formulated by combining the desired isocyanates and, if present, blowing agent and/or additives. In other words, any additives, including blowing agents, may be combined with either or both of the isocyanate side and the polyol side based on chemical and physical compatibility of the ingredients.

Although embodiments of the present invention have generally been described as a two component system, embodiments are not limited thereto. For example, the reaction system may be processed as a two component system or as a multiple component (greater than two) system. Regardless of the number of components, the relative proportions of the components may be metered, either by weight or by volume, to provide a ratio of free isocyanate groups to the total of the isocyanate-reactive groups in a range of from 0.9 to 5, or in a range of from 0.95 to 4. In embodiments for a polyurethane foam, the ratio of the mutually reactive equivalents may be from 0.9 to 1.5, or 0.95 to 1.2. Alternatively, in an embodiment of a polyisocyanurate foam the equivalents ratio is preferred to be in the range of 2 to 5, or 2.25 to 4, although ratios are not limited thereto. Furthermore, in embodiments of a polyisocyanurate foam the reaction system typically includes a catalyst for the conversion of free isocyanate groups to isocyanurate groups. Examples of isocyanate trimerization catalysts include potassium salts of carboxylic acids, such as potassium octoate (potassium 2-ethyl hexanoate), although embodiments are not limited to such salts.

In other embodiments of the present invention, a foam may be made using a one-shot, prepolymer, or semi-prepolymer technique together with any mixing method such as impingement mixing. In some embodiments, after mixing, the rigid foam reaction system (while still liquid) may be dispensed into a cavity (cavity filling), molded, open poured for making slabstock, sprayed, frothed, or laminated with facing materials such as paper, metal, plastics, or wood-board.

EXAMPLES

The various aspects of this invention are illustrated, but not limited, by the following examples. Unless otherwise noted, all temperatures are expressed in degrees Celsius and all formulation components are expressed in parts by weight. The following reaction components are referred to in these examples. Each of the polyols listed below has a nominal hydroxyl group functionality of 2 or greater.

Polyol 1: a sucrose and triethanol amine co-initiated polyether polyol of OH value 495 mg KOH/g.

Polyol 2: a polymethylene polyphenylene polyamine initiated polyether polyols of OH value 500 mg KOH/g.

Polyol 3: a sucrose and diethylene glycol co-initiated polyether polyol of OH value 441 mg KOH/g.

Polyol 4: a polyether polyol initiated with a Mannich condensate of nonyl-phenol, formaldehyde and dialkanolamine of OH value 425 mg KOH/g.

Polyol 5: a polyether polyol initiated with a Mannich condensate of nonyl-phenol, formaldehyde and dialkanolamine of OH value 470 mg KOH/g.

Polyol 6: a polyether polyol initiated with a Mannich condensate of nonyl-phenol, formaldehyde and dialkanolamine of OH value 650 mg KOH/g.

Polyol 7: a glycerol initiated polyether polyol of OH value 35 mg KOH/g.

Polyol 8: a glycerol initiated polyether polyol of OH value 240 mg KOH/g.

Polyol 9: an aromatic polyester polyol made by reaction of phthalic anhydride and diethylene glycol of OH value 240 mg KOH/g available as STEPANPOL PS-2352 polyol from Stepan Company.

Polyol 10: a sucrose and glycerine co-initiated polyether polyol of OH value 360 mg KOH/g.

Polyol 11: a sucrose and dietylene glycol co-initiated polyether polyol of OH value 361 mg KOH/g.

Polyol 12: polymethylene polyphenylene polyamine initiated polyether polyols of OH value 310 mg KOH/g.

Polyol 13: a polyether polyol initiated with a Mannich condensate of nonyl-phenol, formaldehyde and dialkanolamine of OH value 330 mg KOH/g.

Polyol 14: a polyether polyol initiated with a Mannich condensate of phenol, formaldehyde and dialkanolamine of OH value 530 mg KOH/g.

Polyol 15: Monoethylene glycol of OH value 1810 mg KOH/g.

POLYCAT® 5 catalyst: N,N, N', N'', N'''-pentamethyldiethylenetriamine, a catalyst available from Huntsman Petrochemical LLC.

POLYCAT® 8 catalyst: N,N-dimethylcyclohexylamine, a catalyst available from Huntsman Petrochemical LLC.

DABCO® DC 193 surfactant: a silicone surfactant available from Air Products.

HCFO-1233zd: 1-chloro-3,3,3-trifluoropropene available from SynQuest Laboratories, Inc.

HCFO-1336m/z: Z-1,1,1,4,4,4-hexafluoro-2-butene available from SynQuest Laboratories, Inc.

RUBINATE® M: Polymeric MDI of NCO value 30.5% available from Huntsman International LLC This polyisocyanate product has a number averaged isocyanate (—NCO) group functionality of about 2.7.

Example 1

3 gms of the blowing agent HCFO-1233zd was added to 10 gms of each of Polyol 1 to Polyol 15 and mixed. A clear solution was observed in all cases suggesting that solubility of HCFO-1233zd was above 30 weight % in each individual polyol.

Example 2

Varying weights of blowing agent HCFO-1336m/z was added to 10 gms of Polyol 1 and to 10 gms of Polyol 2 at 25° C. and mixed. Equilibrium solubility of HCFO-1336m/z in Polyol 1 (a polyol which is not a Ci type polyol) was 4.8% whereas it was 9.5% in Polyol 2 (a Ci type polyol). Higher blowing agent solubility in polyol is desirable.

Example 3

Rigid polyurethane foams were produced using the reaction systems of Table 2, below. These reaction systems include a polyol side, which may include a polyol, blowing agent, catalyst, and other additives, and an isocyanate side, which may include an isocyanate. Note that the polyol side of the reaction systems of Table 2 includes a single polyol (not a mixture or blend of polyols). Note also that the reaction system for foam A includes a polyol that is not a Ci polyol whereas the reaction systems for foams B and C do. To make foams A-C, the polyol side components were added to a clean glass jar (one jar for each system), which were vigorously shaken by hand. Before adding the isocyanate, the mixed polyol sides were observed for component solubility. Each polyol side showed a clear, homogeneous liquid. Thereafter, the isocyanate sides were added to the respective polyol sides and were mixed for six seconds at 2000 rpm using a Dewalt D106 drill attached to mixing rod with 4 blades. The resulting foams were measured for closed cell content according to ASTM D6226. Foams A-C had a relatively low closed cell content. A closed cell content of 85% or higher is typical of rigid polyurethane foams produced with blowing agents such as HFC, HC, CFCs, and HCFCs. Generally, the higher the closed cell content of a rigid polyurethane foam the better the thermal insulation performance, everything else being the same.

TABLE 2

| | Foam | | |
|---|---|---|---|
| | A | B | C |
| System components Polyol Side | | | |
| Polyol 9 | 100 | | |
| Polyol 11 | | 100 | |
| Polyol 12 | | | 100 |
| POLYCAT ® 5 catalyst | 0.2 | 0.2 | 0.2 |
| POLYCAT ® 8 catalyst | 1 | 1 | 1 |
| DABCO ® DC 193 surfactant | 2 | 2 | 2 |
| Water | 2 | 2 | 2 |
| HCFO-1233zd | 30 | 30 | 30 |
| Total Polyol side | 135.2 | 135.2 | 135.2 |
| Visual observation | Clear | Clear | Clear |
| Isocyanate Side | | | |
| RUBINATE ® M isocyanate | 124.9 | 112.0 | 117.2 |
| Isocyanate index | 108 | 108 | 108 |
| Foam Property | | | |
| Closed cell content % | 77 | 82 | 82 |

Example 4

Rigid polyurethane foams were produced by mixing the reaction systems listed in Table 3, below. These systems were mixed according to the process described in Example 3. In the reaction systems of Table 3, however, two polyols were blended together in such a way that, for each blend, the OH value was 400 mg KOH/g. The polyol blends for reaction systems D and F do not include a Ci type polyol whereas the polyol blends for reaction systems E, G, H, and I do. The Foams D through I resulting from the corresponding reaction systems were measured for closed cell content according to ASTM D6226. Foams E, G, H, and I, which contained a mixture of a Ci polyol and a Cii polyol had a higher percentage of closed cells than Foams D and F.

TABLE 3

| | Foam | | | | | |
|---|---|---|---|---|---|---|
| System Components | D | E | F | G | H | I |
| Polyol Side | | | | | | |
| Polyol 1 | 79.3 | | | | | |
| Polyol 2 | | 78.7 | | | | |
| Polyol 3 | | | 90 | | | |
| Polyol 4 | | | | 93.3 | | |
| Polyol 5 | | | | | 84.7 | |
| Polyol 6 | | | | | | 59.3 |
| Polyol 7 | 20.7 | 21.3 | 10 | 6.7 | 15.3 | 41.7 |
| POLYCAT ® 5 catalyst | 0.2 | 0.2 | 0.2 | 0.2 | 0.2 | 0.2 |
| POLYCAT ® 8 catalyst | 1 | 1 | 1 | 1 | 1 | 1 |

TABLE 3-continued

| | Foam | | | | | |
|---|---|---|---|---|---|---|
| System Components | D | E | F | G | H | I |
| DABCO ® DC 193 surfactant | 2 | 2 | 2 | 2 | 2 | 2 |
| Water | 2 | 2 | 2 | 2 | 2 | 2 |
| HCFO-1233zd | 30 | 30 | 30 | 30 | 30 | 30 |
| Total Polyol side | 135.2 | 135.2 | 135.2 | 135.2 | 135.2 | 135.2 |
| Visual observation | Clear | Clear | Clear | Clear | Clear | Clear |
| Isocyanate Side | | | | | | |
| RUBINATE ® M isocyanate | 135.2 | 135.2 | 135.2 | 135.2 | 135.2 | 135.2 |
| Isocyanate Index | 108 | 108 | 108 | 108 | 108 | 108 |
| Foam Property | | | | | | |
| Closed cell content % | 82 | 89 | 71 | 90 | 90 | 87 |

Example 5

Another series of rigid polyurethane foams were produced. These foams, however, were made from the reaction systems of Table 4, below, and were mixed according to the process described in Example 3. The reaction systems for Foams J though P include a blend of two polyols mixed in a weight ratio so the OH value of each polyol blend is 400 mg KOH/g. The reaction systems for Foams J through M do not include a Ci type polyol but the reaction systems for Foams N, O, and P do. That is, the reaction systems for Foams N, O, and P contain a mixture of two polyols, one a Ci type polyol and another Cii type polyol. Foams J through P resulting from the corresponding reaction systems were measured for closed cell content according to ASTM D6226. As indicated by Table 4, Foams N, O, and P had a higher percentage of closed cell content than Foams J though M.

TABLE 4

| System Components | Foams | | | | | | |
|---|---|---|---|---|---|---|---|
| | J | K | L | M | N | O | P |
| Polyol Side | | | | | | | |
| Polyol 8 | 89.8 | | | | | | |
| Polyol 9 | | 89.8 | | | | | |
| Polyol 10 | | | 97.2 | | | | |
| Polyol 11 | | | | 97.2 | | | |
| Polyol 12 | | | | | 94 | | |
| Polyol 13 | | | | | | 95.3 | |
| Polyol 14 | | | | | | | 96.6 |
| Polyol 15 | 10.2 | 10.2 | 2.8 | 2.8 | 6 | 4.7 | 3.4 |
| POLYCAT ® 5 catalyst | 0.2 | 0.2 | 0.2 | 0.2 | 0.2 | 0.2 | 0.2 |
| POLYCAT ® 8 catalyst | 1 | 1 | 1 | 1 | 1 | 1 | 1 |
| DABCO ® DC 193 surfactant | 2 | 2 | 2 | 2 | 2 | 2 | 2 |
| Water | 2 | 2 | 2 | 2 | 2 | 2 | 2 |
| HCFO-1233zd | 30 | 30 | 30 | 30 | 30 | 30 | 30 |
| Total Polyol side | 135.2 | 135.2 | 135.2 | 135.2 | 135.2 | 135.2 | 135.2 |
| Visual observation | Clear | Cloudy | Clear | Clear | Clear | Clear | Clear |
| Isocyanate Side | | | | | | | |
| RUBINATE ® M isocyanate | 135.2 | 135.2 | 135.2 | 135.2 | 135.2 | 135.2 | 135.2 |
| Isocyanate Index | 108 | 108 | 108 | 108 | 108 | 108 | 108 |
| Foam Property | | | | | | | |
| Closed cell content % | 47 | 3 | 81 | 80 | 86 | 86 | 87 |

The above Tables show that rigid foams having good properties, such as closed cell content, can be achieved when certain polyols are present in a reaction system containing a hydrofluoroalkene blowing agent. For example, rigid foams with a high percentage of closed cells can result when the hydrofluoroalkene HCFO 1233zd is used as a blowing agent in reaction systems that include either (i) an polyol containing an aromatically bound secondary or a tertiary amine nitrogen atom, or (ii) a Mannich polyol containing a secondary or tertiary amine nitrogen, together with other, different polyols. Hydrofluoroalkene HCFO 1233zd is a promising blowing agent for use in rigid polyurethane foams as it is liquid and has a very, very low ODP, low GWP, and no VOC issues.

The invention claimed is:

1. A process for preparing a rigid polymeric foam having a closed cell content of greater than 85% and a density of less than 4.5 pounds per cubic foot comprising reacting:
    (a) an isocyanate composition comprising one or more organic polyisocyanates; and
    (b) an isocyanate reactive composition comprising:
        (i) a first polyol, wherein the first polyol is a aminic polyol selected from the group consisting of aromatic amine-initiated polyols, Mannich polyols, and mixtures thereof; and
        (ii) a second polyol having a nominal hydroxyl functionality of at least 2 and a molecular weight of from 60 to 10,000 that is different than the first polyol and is free of amine groups,
    wherein either the isocyanate composition or the isocyanate reactive composition further comprises 1,1,1,4,4,4-hexafluoro-2-butene; and
    wherein the weight ratio of the first polyol to the the second polyol is from 90:10 to 40:60 and the combined weights of the first polyol and the second polyol is at least 30% of the total weight of the reaction system.

2. A rigid polyurethane or polyisocyanurate foam having a closed cell content of greater than 85% and a density of less than 4.5 pounds per cubic foot comprising the reaction product of:
    (a) an organic polyisocyanate composition; and
    (b) an isocyanate reactive composition comprising:
        (i) a first polyol, wherein the first polyol is an aminic polyol selected from the group consisting of aromatic amine-initiated polyols, Mannich polyols, and mixtures thereof;
        (ii) a second polyol having a nominal hydroxyl functionality of at least 2 and a molecular weight of from 60 to 10,000 that is different than the first polyol and is free of amine groups; and
        (iii) a blowing agent composition comprising 1,1,1,4,4,4-hexafluoro-2-butene, and
    wherein the weight ratio of the first polyol to the the second polyol is from 90:10 to 40:60 and the combined weights of the first polyol and the second polyol is at least 30% of the total weight of the reaction system.

3. The process of claim 1, wherein a polyol blend comprises the first polyol and the second polyol and wherein the polyol blend has a OH value of 400 mg KOH/g.

4. The process of claim 1, wherein the aromatic amine-initiated polyol has a nominal hydroxyl functionality of at least 2 and a molecular weight of greater than 300 and less than 10,000.

5. The process of claim 1, wherein the Mannich polyol has a nominal hydroxyl functionality of at least 2, has a molecular weight of greater than 150 and less than 10,000, and contains at least one secondary or tertiary amine nitrogen atom.

6. The process of claim 1, wherein the reaction system further comprises one or more chemical blowing agents.

7. The process of claim 6, wherein the one or more chemical blowing agents is water.

8. The process of claim 7, wherein water comprises at least 0.2% and less than 5% by weight based on the total weight of components (a) and (b).

9. The rigid polyurethane or polyisocyanurate foam of claim 2, wherein a polyol blend comprises the first polyol and the second polyol and wherein the polyol blend has a OH value of 400 mg KOH/g.

10. The rigid polyurethane or polyisocyanurate foam of claim 2, wherein the aromatic amine-initiated polyol has a nominal hydroxyl functionality of at least 2 and a molecular weight of greater than 300 and less than 10,000.

11. The rigid polyurethane or polyisocyanurate foam of claim 2, wherein the Mannich polyol has a nominal hydroxyl functionality of at least 2, has a molecular weight of greater than 150 and less than 10,000, and contains at least one secondary or tertiary amine nitrogen atom.

12. The rigid polyurethane or polyisocyanurate foam of claim 2, wherein the reaction system further comprises one or more chemical blowing agents.

13. The rigid polyurethane or polyisocyanurate foam of claim 12, wherein the one or more chemical blowing agents is water.

14. The rigid polyurethane or polyisocyanurate foam of claim 13, wherein water comprises at least 0.2% and less than 5% by weight based on the total weight of components (a) and (b).

* * * * *